(12) United States Patent
Pan et al.

(10) Patent No.: US 10,748,675 B2
(45) Date of Patent: Aug. 18, 2020

(54) BITE-RESISTANT CABLE WITH ANTI-RODENT AND ANTI-TERMITE FUNCTIONS

(71) Applicant: Hong Tai Electric Industrial Co., LTD, Taoyuan (TW)

(72) Inventors: Chun-Hsiung Pan, Taipei (TW); Wen-Ping Li, Taoyuan (TW); Shih-Kai Wei, Hsinchu (TW)

(73) Assignee: Hong Tai Electric Industrial Co., LTD, Taoyuan (TW)

( * ) Notice: Subject to any disclaimer, the term of this patent is extended or adjusted under 35 U.S.C. 154(b) by 0 days.

(21) Appl. No.: 16/683,272

(22) Filed: Nov. 14, 2019

(65) Prior Publication Data

US 2020/0152355 A1 May 14, 2020

(30) Foreign Application Priority Data

Nov. 14, 2018 (TW) .............................. 107140388 A

(51) Int. Cl.
*H01B 7/18* (2006.01)
*H01B 3/48* (2006.01)
*H01B 3/30* (2006.01)
*A01M 29/12* (2011.01)

(52) U.S. Cl.
CPC ........... *H01B 7/1805* (2013.01); *A01M 29/12* (2013.01); *H01B 3/30* (2013.01); *H01B 3/48* (2013.01)

(58) Field of Classification Search
CPC combination set(s) only.
See application file for complete search history.

(56) References Cited

U.S. PATENT DOCUMENTS

| 3,878,444 | A | * | 4/1975 | Miller | ...................... H01B 7/22 361/232 |
| 4,171,463 | A | * | 10/1979 | Watkins | ................. H01B 7/282 174/120 R |
| 5,473,113 | A | * | 12/1995 | Aldissi | ............... H01B 11/1033 174/107 |
| 7,287,489 | B1 | * | 10/2007 | O'Brien | ................. A01K 15/02 119/712 |
| 2002/0197295 | A1 | * | 12/2002 | Stein | ...................... A01N 53/00 424/405 |
| 2007/0225515 | A1 | * | 9/2007 | Blum | .................... C07C 237/04 554/52 |
| 2017/0051137 | A1 | * | 2/2017 | Dussich | ................. A01N 25/10 |

FOREIGN PATENT DOCUMENTS

CN 105969236 A * 9/2016

* cited by examiner

*Primary Examiner* — Binh B Tran
*Assistant Examiner* — Krystal Robinson
(74) *Attorney, Agent, or Firm* — Li & Cai Intelllectual Property Office

(57) ABSTRACT

A bite-resistant cable includes at least one core cable and a cover layer surrounding the at least one core cable. The cover layer contains a peppery agent and an algefacient. The content of the peppery agent is between 0.5 wt % and 5 wt % of the total weight of the cover layer. The content of the algefacient is between 0.5 wt % and 5 wt % of the total weight of the cover layer. Therefore, the service life of the cable can be extended and a stable power supply can be provided.

14 Claims, 2 Drawing Sheets

BITE-RESISTANT CABLE WITH ANTI-RODENT AND ANTI-TERMITE FUNCTIONS

CROSS-REFERENCE TO RELATED PATENT APPLICATION

This application claims the benefit of priority to Taiwan Patent Application No. 107140388, filed on Nov. 14, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a power cable, and more particularly to a bite-resistant cable.

BACKGROUND OF THE DISCLOSURE

The conventional cable structure includes conductor(s), an insulating layer and a cover layer. The conductor(s) are clad in the insulating layer, and the insulating layer is clad in the cover layer. Generally, the cover layer is formed from plastics having a Mohs hardness between 2.0 and 2.5, and cannot provide a bite-resistant effect. However, an outdoor cable is often bitten by pests such as termites and rodents. Once the insulating layer and the cover layer are bitten through, the innermost conductor(s) would be exposed. Thus, a short circuit fault of the cable may easily occur and even cause fire hazards. This may result in serious damage.

In order to prevent the cable from biting by pests such as termites and rodents, the main protection means used in the current industry includes physical and chemical methods. The physical method is using a high hardness plastic (e.g., nylon) to form the cover layer of the cable. The resulting cover layer having high hardness, good toughness and high surface gloss can achieve a bite-resistant effect. Furthermore, a rigid protection layer can be disposed inside the cover layer to increase the bite-resistant effect. In addition, the chemical method is adding a repellent agent (e.g., chlordane, aldrin and dieldrin) in the cover layer or coating a layer containing the repellent agent on the surface of the cover layer. Accordingly, the cable can have an odor or a viscosity which pests such as termites and rodents fear or hate.

Although the physical method does not harm the human body and the environment, and has a long and effective time of preventing bites, the hard plastic or rigid material may cause an increase in weight, difficulties in installing the cable, a complicated production process, and high cost. For example, in the case of using nylon to form the cover layer of the cable, the production process is more complicated and requires a nylon-specific extrusion machine, which would cause high costs. In addition, when the chemical method is used to prevent the cable from biting by termites or rodents, the repellent agent not only releases highly toxic substances in the production process, which are difficult to be decomposed, but causes a great threat to the human body and the environment.

Therefore, how the problems resulting from the conventional cable structure can be solved, and how a cable structure having good anti-rodent and anti-termite functions can be provided has become an apparent issue to those skilled in the art.

SUMMARY OF THE DISCLOSURE

In response to the above-referenced technical inadequacies, the present disclosure provides a bite-resistant cable which can prevent pests such as rodents and termites from biting and has no harmful effects on the human body and environment.

In one aspect, the present disclosure provides a bite-resistant cable which includes at least one core cable and a cover layer. The cover layer surrounds the at least one core cable, and the cover layer contains a peppery agent and an algefacient. The peppery agent is capsaicin and the content thereof is between 2 wt % and 5 wt % of the total weight of the cover layer. The algefacient is menthol and the content thereof is between 2 wt % and 5 wt % of the total weight of the cover layer.

In one aspect, the present disclosure provides a bite-resistant cable which includes at least one core cable and a cover layer. The cover layer surrounds the at least one core cable, and the cover layer contains a peppery agent, an anti-insect agent and an algefacient. The peppery agent is capsaicin and the content thereof is between 2 wt % and 5 wt % of the total weight of the cover layer. The content of the anti-insect agent is between 0.5 wt % and 5 wt % of the total weight of the cover layer. The algefacient is menthol and the content thereof is between 2 wt % and 5 wt % of the total weight of the cover layer.

In one aspect, the present disclosure provides a bite-resistant cable which includes at least one core cable and a cover layer. The cover layer surrounds the at least one core cable, and the cover layer contains a peppery agent. The content of the peppery agent is between 2 wt % and 5 wt % of the total weight of the cover layer. The peppery agent includes 10 wt % to 30 wt % of capsaicin or dihydrocapsaicin, and includes 70 wt % to 90 wt % of nonivamide.

In certain embodiments, the peppery agent is present in the cover layer in the form of micro-capsules.

In certain embodiments, the cover layer is formed from a polyolefin resin or a thermoplastic elastomer.

In certain embodiments, the bite-resistant cable further includes a shielding layer that is disposed inside the cover layer and surrounds the at least one core cable.

In certain embodiments, the shielding layer is formed from glass fibers.

In certain embodiments, the anti-insect agent is pyrethroid compound

One of the effects of the present disclosure is that the bite-resistant cable, in which the contents of the peppery agent and the algefacient each are between 2 wt % and 5 wt % of the total weight of the cover layer, can, in a nontoxic manner, force rats and other rodents to stop biting, so as to ensure a stable power supply. Therefore, any short circuit fault and cable accident can be avoided.

Furthermore, the cover layer can further contain an anti-insect agent, and the content of the anti-insect agent is between 0.5 wt % and 5 wt % of the total weight of the cover layer. Therefore, the cable can be prevented from being bitten by termites and other pests.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
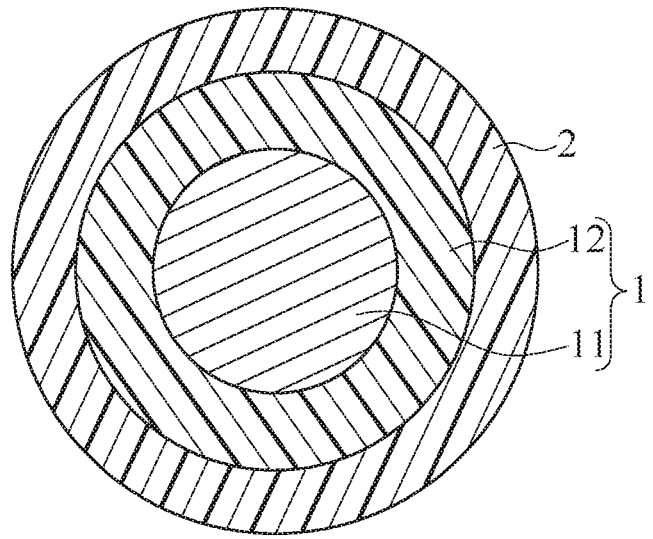
FIG. 1 is a schematic view of a bite-resistant cable according to a first embodiment of the present disclosure.

Electricity has brought great conveniences to human life. Modern people use electrical appliances in their daily lives. In general, it can be said that electricity and modern people are inseparable. A cable is a main tool for power transmission, and the power transmission may be interrupted when the cable is damaged. Therefore, the present disclosure provides a bite-resistant cable which can provide a chemical stimulating effect on rats and termites in a nontoxic and environmentally friendly manner so as to force them to stop biting, so that insulation breakdown will not occur.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
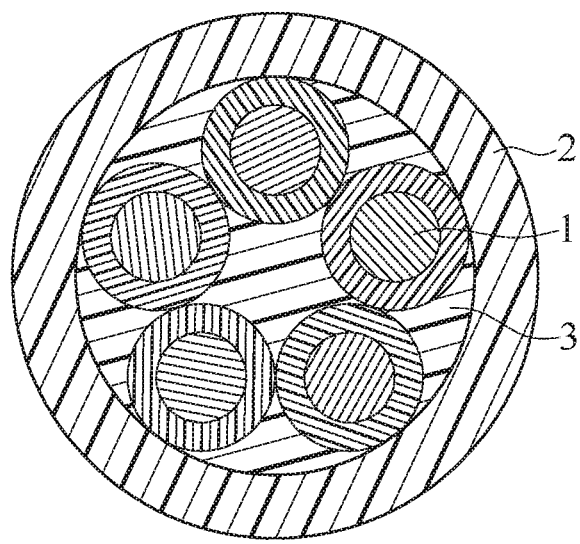
FIG. 2 is another schematic view of the bite-resistant cable according to the first embodiment of the present disclosure.
Figure 3:
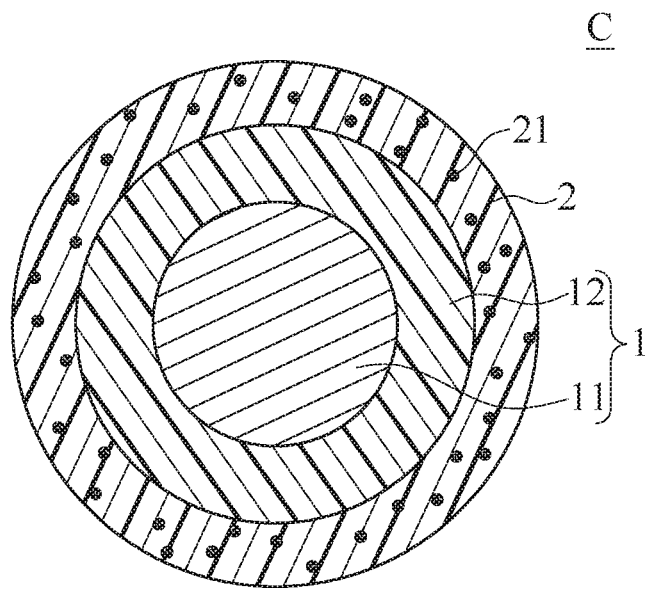
FIG. 3 is still another schematic view of the bite-resistant cable according to the first embodiment of the present disclosure.

Referring to FIG. 1 to FIG. 3, the bite-resistant cable C according to the first embodiment of the present disclosure includes at least one core cable 1 and a cover layer 2. The cover layer 2 defines an accommodating space (not numbered), and the at least one core cable 1 is disposed in the accommodating space.

In practice, as shown in FIG. 1, the bite-resistant cable C can include only one core cable 1 for transmitting current, and the cover layer 2 is coated on an outer peripheral surface of the core cable 1. As shown in FIG. 2, the bite-resistant cable C can also include a plurality of core cables 1 for correspondingly transmitting current and other signals. The cover layer 2 surrounds the core cables 1, and fillers 3 such as PP ropes or PVC ropes can be disposed among the cover layer 2 and the core cables 1, such that the bite-resistant cable C can be more rounded in shape. The core cable 1 can include a conductor 11 and an insulating layer 12 coated on an outer peripheral surface of the conductor 11. The conductor 11 may be made of copper. The insulating layer 12 may be formed by a thermoplastic or thermosetting insulating material. The number and size of the core cable 1 can be changed according to particular requirements, and the present disclosure is not limited thereto.

In the present disclosure, the cover layer 2 can provide a desired bite-resistant effect in a chemical manner. More specifically, the cover layer 2 can contain a peppery agent. The content of the peppery agent can be between 0.5 wt % and 5 wt %, for example 1 wt %, 1.5 wt %, 2 wt %, 2.5 wt %, 3 wt %, 3.5 wt %, 4 wt % or 4.5 wt %, preferably between 2 wt % and 5 wt %, of the total weight of the cover layer 2. Therefore, when rodents such as rats bite the cable, the peppery agent would be released from the cover layer 2. The peppery agent with a strong peppery flavor and a pungent odor can cause the rodents to feel uncomfortable and thus stop biting.

In the present disclosure, the cover layer 2 can be formed from polyvinyl chloride, a polyolefin resin (e.g., polyethylene), a low smoke free halogen (LSFH) material or a thermoplastic elastomer. Preferably, the material of the cover layer 2 is high density polyethylene (HDPE). The reason is that HDPE has an excellent blocking effect on the penetration of small molecular gases such as nitrogen, oxygen, and carbon dioxide and moisture. As required, a plasticizer, a stabilizer, a filler, an antioxidant and/or a crosslinking agent may be mixed in the coating layer 2. The peppery agent may be a natural agent that includes capsaicin and/or analogues thereof Specific examples of the capsaicin analogue include dihydrocapsaicin, nordihydrocapsaicin, homodihydrocapsaicin and homocapsaicin. The structures of capsaicin, dihydrocapsaicin, nordihydrocapsaicin, homodihydrocap saicin and homocapsaicin are respectively represented by formula (1) to formula (5):

formula (1)

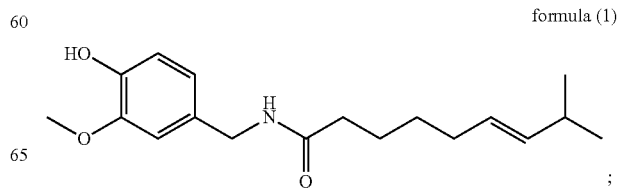

-continued

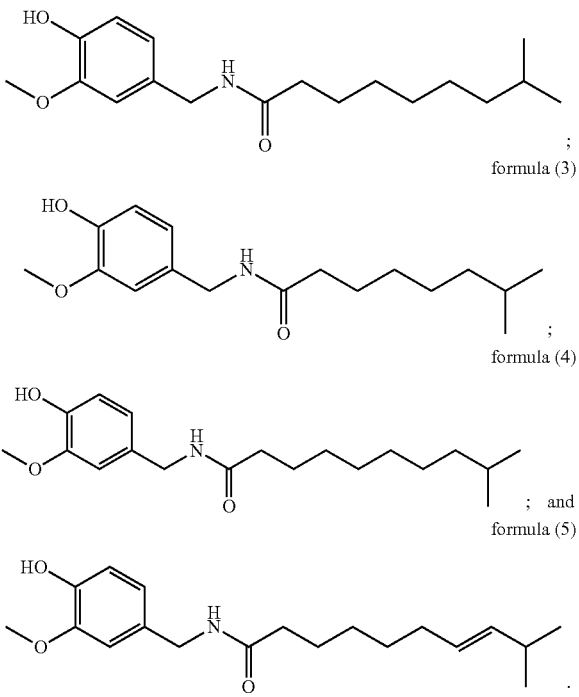

formula (2)

formula (3)

formula (4)

; and formula (5)

The peppery agent may also be a synthetic agent such as nonivamide (also called "Pelargonic Acid Vanillylamide", PAVA), the structure represented by formula (6):

formula (6)

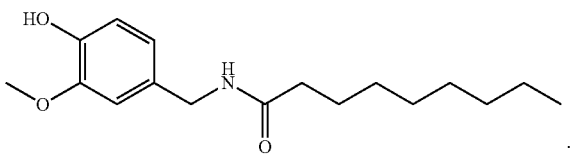

However, the present disclosure is not limited to the above examples.

In consideration of cost and long-term performance, nonivamide is used together with capsaicin or dihydrocapsaicin, preferably dihydrocapsaicin, for serving as the peppery agent. Based on the total amount (100 wt %) of the peppery agent, the content of capsaicin or dihydrocapsaicin can be between 10 wt % and 30 wt %, and the content of nonivamide can be between 70 wt % and 90 wt %. Therefore, the service life (i.e., effective time period of anti-rodent and anti-termite functions) of the bite-resistant cable C can be extended to about 15 to 25 years. That is, the peppery agent of the cover layer 2 can be maintained at an effective concentration for 15-25 years. It should be noted that, compared to dihydrocapsaicin, capsaicin having a carbon-carbon double bond in its molecular structure can be easily decomposed by light.

In order to prevent the peppery agent from moving out of the surface of the cover layer 2, the peppery agent can be present in the cover layer 2 in the form of micro-capsules. That is, as shown in FIG. 3, the cover layer 2 can have a plurality of capsaicin-containing micro-capsules 21 uniformly distributed therein. Therefore, the deterioration (e.g., oxidative degradation) or degradation of the peppery agent can be prevented. The micro-capsules 21 may be formed from melamine-formaldehyde resin, ethyl cellulose, urea-formaldehyde resin and acrylate. However, the present disclosure is not limited to the above examples.

It should be noted that, the cover layer 2 can further contain an algefacient, such that the repellent effect of the peppery agent can be performed effectively. In the presence of the algefacient, the peppery agent can be used in a decreased amount. The content of the algefacient can be between 0.5 wt % and 5 wt %, for example 1 wt %, 1.5 wt %, 2 wt %, 2.5 wt %, 3 wt %, 3.5 wt %, 4 wt % or 4.5 wt %, preferably between 2 wt % and 5 wt %, of the total weight of the cover layer 2. In use, both the peppery agent and the algefacient stimulate the sensations of smell and taste. Once the two stimulations are present at the same time, the mutual influence thereof would cause the human brain to have a stronger perception. Furthermore, the cooling sensation from the algefacient has a synergistic effect on the fiery burning sensation from the peppery agent.

The algefacient may be menthol and/or derivatives thereof Specific examples of the menthol derivative include menthyl lactate, menthone glycerol ketal, monomethyl succinate and p-menthane-3,8-diol.

According to actual requirements, the cover layer 2 can further contain an anti-insect agent for preventing termites and other insects from biting. The content of the anti-insect agent can be between 0.5 wt % and 5 wt %, for example 1 wt %, 1.5 wt %, 2 wt %, 2.5 wt %, 3 wt %, 3.5 wt %, 4 wt % or 4.5 wt %, preferably between 2 wt % and 5 wt %, of the total weight of the cover layer 2. Therefore, when termites or other insects bite the cable, the anti-insect agent would be released from the cover layer 2 and cause them to be poisoned or even cause them death.

The anti-insect agent may be an ester group-containing or ether group-containing pyrethroid compound. Specific examples of the ester group-containing pyrethroid compound include fenvalerate, cyfluthrin, cypermethrin, permethrin, bifenthrin, deltamethrin and cyhalothrin. Specific examples of the ether group-containing pyrethroid compound include etofenprox, halfenprox and silafluofen.

Second Embodiment

Figure 4:
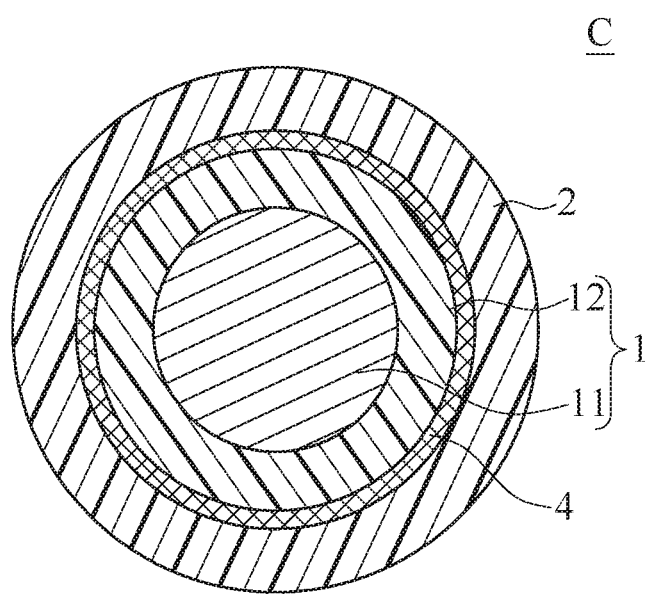
FIG. 4 is a schematic view of the bite-resistant cable according to a second embodiment of the present disclosure.

Referring to FIG. 4, which is to be read in conjunction with FIG. 1, the components of the bite-resistant cable C of the second embodiment are substantially the same as those in the first embodiment. The main difference is that the bite-resistant cable C further includes a shielding layer 4 to provide a desired bite-resistant effect in a physical mariner. The shielding layer 4 is disposed inside the cover layer 2 and surrounds at least one core cable 1. In the present disclosure, the shielding layer 4 may be formed from glass fibers. When rodents such as rats bite the cable, they are easily stabbed by the glass fibers and thus stop biting. Furthermore, the shielding layer 4 can serve as an inner protection layer to block the rodents from biting on the core cable 1

Table 1 and Table 2 below respectively show the results of the anti-rodent and anti-termite tests with respect to examples of the bite-resistant cable C which use different components and contents. The results are obtained in accordance with JB/T 10696.9-2011 and JB/T 10696.10-2011 national standards of the People's Republic of China, which is used to determine mechanical, physical and chemical properties of electric cables and wires.

COMPARATIVE EXAMPLE

The cover layer is formed from a polyolefin resin without adding capsaicin and pyrethroid compounds.

EXAMPLE 1

The cover layer includes 99 wt % of a polyolefin resin, 0.5 wt % of a capsaicin compound and 0.5 wt % of a pyrethroid compound.

EXAMPLE 2

The cover layer includes 98 wt % of a polyolefin resin, 1 wt % of a capsaicin compound and 1 wt % of a pyrethroid compound.

EXAMPLE 3

The cover layer includes 94 wt % of a polyolefin resin, 3 wt % of a capsaicin compound and 3 wt % of a pyrethroid compound.

EXAMPLE 4

The cover layer includes 94 wt % of a polyolefin resin, 2 wt % of a capsaicin compound, 2 wt % of a pyrethroid compound and 2 wt % of an algefacient.

EXAMPLE 5

The cover layer includes 94 wt % of a polyolefin resin, 3 wt % of a capsaicin compound and 3 wt % of a pyrethroid compound. The capsaicin compound includes one of capsaicin and dihydrocapsaicin and nonivamide. The content of capsaicin or dihydrocapsaicin is 10 wt % to 30 wt %, and the content of nonivamide is 70 wt % to 90 wt %.

TABLE 1 anti-rodent test

| | | Bitten depth of cover layer (%) | | | | |
| --- | --- | --- | --- | --- | --- | --- |
| | Comparative | Examples | | | | |
| Test day | Example | 1 | 2 | 3 | 4 | 5 |
| 1 | 0 | 0 | 0 | 0 | 0 | 0 |
| 7 | 70 | 38 | 34 | 24 | 13 | 20 |
| 14 | 100 | 90 | 75 | 45 | 26 | 40 |
| Evaluation level | Poor | Fair | Fair | Good | Very good | Good |

In Table 1, a "very good" evaluation would indicate that the surface of the cover layer has no bite marks or shallow bite marks resulted from rodents. A "good" evaluation indicates that the surface of the cover layer has deep bite marks, the depths of which are not greater than one-half of the thickness of the cover layer. A "fair" evaluation indicates that the depths of the bite marks are greater than one-half of the thickness of the cover layer, but the bite marks do not penetrate the cover layer. A "poor" evaluation indicates that the bite marks penetrate the cover layer.

TABLE 2 anti-termite test

| | | Bitten depth of cover layer (%) | | | | |
| --- | --- | --- | --- | --- | --- | --- |
| | Comparative | Examples | | | | |
| Test day | Example | 1 | 2 | 3 | 4 | 5 |
| 1 | 0 | 0 | 0 | 0 | 0 | 0 |
| 30 | 35 | 5 | 3 | 1 | 3 | 35 |
| 60 | 67 | 25 | 10 | 8 | 7 | 67 |
| 90 | 100 | 45 | 25 | 11 | 15 | 100 |
| Evaluation level | 4 | 3 | 2 | 1 | 1 | 4 |

In Table 2, a "1" evaluation indicates that the surface of the cover layer has no bite marks or shallow bite marks resulted from termites. A "2" evaluation indicates that the bite marks on the surface of the cover layer has a relatively small area and the depths thereof are less than one-third times the thickness of the cover layer. A "3" evaluation indicates that the bite marks on the surface of the cover layer has a relatively large area and the depths thereof are greater than or equal to one-third times the thickness of the cover layer. A "4" evaluation indicates that the bite marks penetrate the cover layer.

One of the effects of the present disclosure is that the bite-resistant cable, in which the contents of the peppery agent and the algefacient each are between 2 wt % and 5 wt % of the total weight of the cover layer, can force rats and other rodents to stop biting in a nontoxic manner so as to ensure a stable power supply. Therefore, the short circuit fault and accident of the cable can be avoided.

Furthermore, the peppery agent can be present in the cover layer in the form of micro-capsules. Therefore, the deterioration (e.g., oxidative degradation) or degradation of the peppery agent can be prevented, and thus the service life of the cable can be extended.

Furthermore, the cover layer can further contain an anti-insect agent, and the content of the anti-insect agent is between 0.5 wt % and 5 wt % of the total weight of the cover layer. Therefore, the cable can be prevented from being bitten by termites and other pests.

Furthermore, the bite-resistant cable of the present disclosure can be provided with many anti-rodent means, i.e., an additional shielding layer can be disposed inside the cover layer to increase the anti-rodent effect of the cable. Therefore, the reliability of the cable can be increased and the service life of the cable can be extended.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A long straight high-frequency transmission cable, comprising: A bite-resistant cable with anti-rodent and anti-termite functions, comprising at least one core cable and a cover layer surrounding the at least one core cable, characterized in that the cover layer contains a peppery agent and an algefacient, wherein the peppery agent includes 10 wt % to 30 wt % of capsaicin or dihydrocapsaicin and 70 wt % to 90 wt % of nonivamide and the content thereof is between 2 wt % and 5 wt % of the total weight of the cover layer, and the algefacient is menthol and the content thereof is between 2 wt % and 5 wt % of the total weight of the cover layer.

2. The bite-resistant cable according to claim 1, wherein the peppery agent is present in the cover layer in the form of micro-capsules.

3. The bite-resistant cable according to claim 1, wherein the cover layer is formed from a polyolefin resin or a thermoplastic elastomer.

4. The bite-resistant cable according to claim 1, further comprising a shielding layer that is disposed inside the cover layer and surrounds the at least one core cable.

5. The bite-resistant cable according to claim 4, wherein the shielding layer is formed from glass fibers.

6. A bite-resistant cable with anti-rodent and anti-termite functions, comprising at least one core cable and a cover layer surrounding the at least one core cable, characterized in that the cover layer contains a peppery agent, an anti-insect agent and an algefacient, wherein the peppery agent includes 10 wt % to 30 wt % of capsaicin or dihydrocapsaicin and 70 wt % to 90 wt % of nonivamideand the content thereof is between 2 wt % and 5 wt % of the total weight of the cover layer, the content of the anti-insect agent is between 0.5 wt % and 5 wt % of the total weight of the cover layer, and the algefacient is menthol and the content thereof is between 2 wt % and 5 wt % of the total weight of the cover layer.

7. The bite-resistant cable according to claim 6, wherein the peppery agent is present in the cover layer in the form of micro-capsules.

8. The bite-resistant cable according to claim 6, wherein the anti-insect agent is pyrethroid compound.

9. The bite-resistant cable according to claim 6, wherein the cover layer is formed from a polyolefin resin or a thermoplastic elastomer.

10. The bite-resistant cable according to claim 6, further comprising a shielding layer that is disposed inside the cover layer and surrounds the at least one core cable.

11. The bite-resistant cable according to claim 10, wherein the shielding layer is formed from glass fibers.

12. A bite-resistant cable with anti-rodent and anti-termite functions, comprising at least one core cable and a cover layer surrounding the at least one core cable, characterized in that the cover layer contains a peppery agent and the content of the peppery agent is between 2 wt % and 5 wt % of the total weight of the cover layer, wherein the peppery agent includes 10 wt % to 30 wt % of capsaicin or dihydrocapsaicin, and includes 70 wt % to 90 wt % of nonivamide.

13. The bite-resistant cable according to claim 12, wherein the peppery agent is present in the cover layer in the form of micro-capsules.

14. The bite-resistant cable according to claim 12, wherein the cover layer is formed from a polyolefin resin or a thermoplastic elastomer.

\* \* \* \* \*